(12) United States Patent
Barlas

(10) Patent No.: US 8,196,253 B2
(45) Date of Patent: Jun. 12, 2012

(54) WINDSCREEN WIPER DEVICE, IN PARTICULAR FOR A MOTOR VEHICLE

(75) Inventor: Burak Barlas, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 919 days.

(21) Appl. No.: 11/997,803

(22) PCT Filed: Jul. 31, 2006

(86) PCT No.: PCT/EP2006/064857
§ 371 (c)(1),
(2), (4) Date: Feb. 4, 2008

(87) PCT Pub. No.: WO2007/028678
PCT Pub. Date: Mar. 15, 2007

(65) Prior Publication Data
US 2008/0222828 A1    Sep. 18, 2008

(30) Foreign Application Priority Data
Sep. 9, 2005    (DE) .......................... 10 2005 042 847

(51) Int. Cl.
*B60S 1/06*    (2006.01)
(52) U.S. Cl. .................. 15/250.31; 15/250.3; 15/250.34
(58) Field of Classification Search .................. 15/250.3, 15/250.31, 250.34; 296/96.15
See application file for complete search history.

(56) References Cited

U.S. PATENT DOCUMENTS

| 6,317,918 B1 * | 11/2001 | Kagawa et al. | 15/250.31 |
| 6,513,186 B1 * | 2/2003 | Zimmer | 15/250.34 |
| 6,558,066 B1 * | 5/2003 | Zimmer | 403/374.4 |
| 6,568,023 B2 * | 5/2003 | Perin et al. | 15/250.3 |
| 7,581,278 B2 * | 9/2009 | Zimmer | 15/250.31 |
| 2004/0045115 A1 | 3/2004 | Zimmer | |

FOREIGN PATENT DOCUMENTS

| DE | 10255775 A1 | 6/2004 |
| EP | 1215094 A2 | 6/2002 |
| EP | 1550590 | 7/2005 |
| FR | 2850922 A1 | 8/2004 |
| WO | WO 2004050439 A1 * | 6/2004 |

OTHER PUBLICATIONS

PCT/EP2006/064857 International Search Report.

* cited by examiner

*Primary Examiner* — Gary Graham
*Assistant Examiner* — Michael Jennings
(74) *Attorney, Agent, or Firm* — Michael Best & Friedrich LLP

(57) ABSTRACT

A windscreen wiper device (10), in particular for a motor vehicle, comprises at least one wiper bearing (14) provided with a bearing housing (24). The wiper shaft (22) mounted in the bearing housing (24) can move a wiper arm to a first end (26). The inventive device also comprises an element (40) which axially supports the wiper shaft (22). According to said invention, the element (40) is embodied in the form of a bridging element.

15 Claims, 6 Drawing Sheets

WINDSCREEN WIPER DEVICE, IN PARTICULAR FOR A MOTOR VEHICLE

BACKGROUND OF THE INVENTION

The invention relates to a windshield wiper device, in particular for a motor vehicle.

Numerous windshield wiper devices are already known, for example from DE-A-10255775, which have a wiper bearing with a bearing housing in which a wiper shaft is mounted and axially fixed by means of an element. The wiper shaft bears a wiper arm on its free, first end and a wiper blade can be fastened to the free end of said wiper arm. Axial fixation in this case is embodied such that the element is deformed with the absorption of energy when force has an effect on the wiper arm or on the first end of the wiper arm shaft. As a result, if a pedestrian impacts the wiper arms or the wiper shaft of the windshield wiper device during an accident, they can yield, thereby preventing, or at least reducing, injury to the pedestrian. Because the element is able to absorb energy, it also prevents the pedestrian from being subjected to the entire energy from the impact on the vehicle body. For this purpose, a spring is provided as an element for axial fixation, and this spring makes it possible for the wiper shaft to yield when a pedestrian impacts the free, first end of the wiper shaft and, in doing so, to absorb energy from the impact. In order to keep the wiper shaft in operation in a stable position, predetermined breaking points are provided that axially stabilize the wiper shaft in normal operation. However, this type of embodiment is relatively complex and costly.

SUMMARY OF THE INVENTION

The advantage of the windshield wiper device in accordance with the invention with the features of the main claim is that the element is embodied as a bridging element. In this way, the force that is required to enable the wiper shaft to yield can be metered out precisely and remain constant over the service life of the windshield wiper device. In addition, this type of embodiment is simple and cost-effective to manufacture.

Advantageous developments and improvements of the features disclosed in the main claim are yielded from the measures listed in the subordinate claims.

It is particularly advantageous if the wiper shaft has a shoulder and the bridging element is arranged between the bearing housing and the shoulder in order to render a stable axial fixation in normal operation possible.

In a simple embodiment, the shoulder is embodied essentially in a disk-shaped manner and surrounds the wiper shaft.

One component can be dispensed in an advantageous manner if the shoulder is embodied as a single piece with the wiper shaft.

It is especially advantageous if the bridging element has at least three planes that are coaxial to the wiper shaft, which are connected by connecting pieces. In this case, it is further advantageous if the connecting pieces run diagonal to the wiper shaft.

It is particularly advantageous if the connecting pieces are arranged parallel to the wiper shaft. In this case, it is a further advantage if the connecting pieces do not overlap with a projection on a plane that is parallel to the wiper shaft, thereby making a simple and cost-effective possibility of manufacturing the bridging element possible.

In an especially effective embodiment of the windshield wiper device, the bridging element has at least one predetermined breaking point.

In this case, it is an advantage if the predetermined breaking point is arranged in at least one plane, in particular, in one of the center planes.

An especially effective variation is produced in that each plane is connected to the respective adjacent plane by at least three, in particular, four connecting pieces, and at least one predetermined breaking point is provided for each connecting piece in the adjacent, not the outer-edge plane, in order to make it possible for the wiper shaft to yield easily in an impact with a pedestrian.

In an especially simple embodiment, the wiper shaft can be driven by a drive crank, which is embodied as a single piece with the shoulder or that itself serves as a shoulder.

The bridging element is advantageously protected from corrosion, in particular, embodied of plastic. A long service life and reliable functioning is achieved in that the bearing housing, the wiper shaft or the shoulder have securing agents to prevent twisting or displacement of the bridging element.

The bridging element can be embodied especially simply and cost-effectively as a single piece with the bearing housing.

BRIEF DESCRIPTION OF THE DRAWINGS

Various exemplary embodiments of the invention are depicted in the drawings and are explained in greater detail in the following. The drawings show.

DETAILED DESCRIPTION

Figure 1:
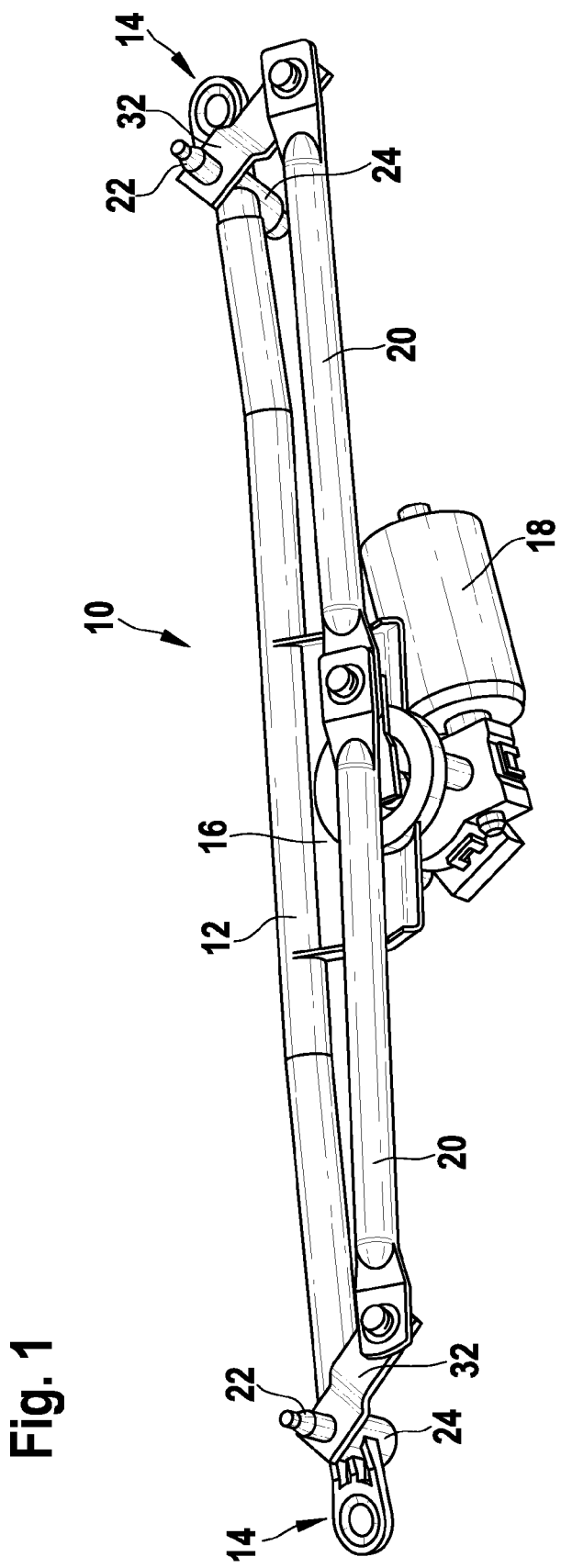
FIG. 1 A perspective representation of the windshield wiper device in accordance with the invention FIG. 2 A side view of the wiper bearing of a windshield wiper device in accordance with the invention FIG. 3 A side view of a bridging element of a windshield wiper device in accordance with the invention FIGS. 4, 5 and 6 A bridging element of a windshield wiper device in accordance with the invention during an impact FIG. 7 The wiper bearing from FIG. 2 after an impact FIG. 8 A variation of a wiper bearing of a windshield wiper device in accordance with the invention

FIG. 1 shows a perspective representation of a windshield wiper device 10 in accordance with the invention. Said windshield wiper device is comprised essentially of a support tube 12, which bears a wiper bearing 14 on each of the ends of its longitudinal extension. In addition, a motor support 16 bearing a wiper motor 18 is fastened on the support tube 12. This wiper motor 18 drives wiper shafts 22 via thrust rods 20, and said wiper shafts are mounted in the bearing housing 24 of the wiper bearing 14. To do this, the thrust rod 20 is coupled to a drive crank 32, which in turn is connected in a rotationally fixed manner to the wiper shaft 22.

The wiper bearing 14 also features a fastening eye 15, which is arranged on the side of the wiper bearing facing away from the support tube. A rubber bushing 17 to dampen vibrations sits in the fastening eye 15.

Figure 2:
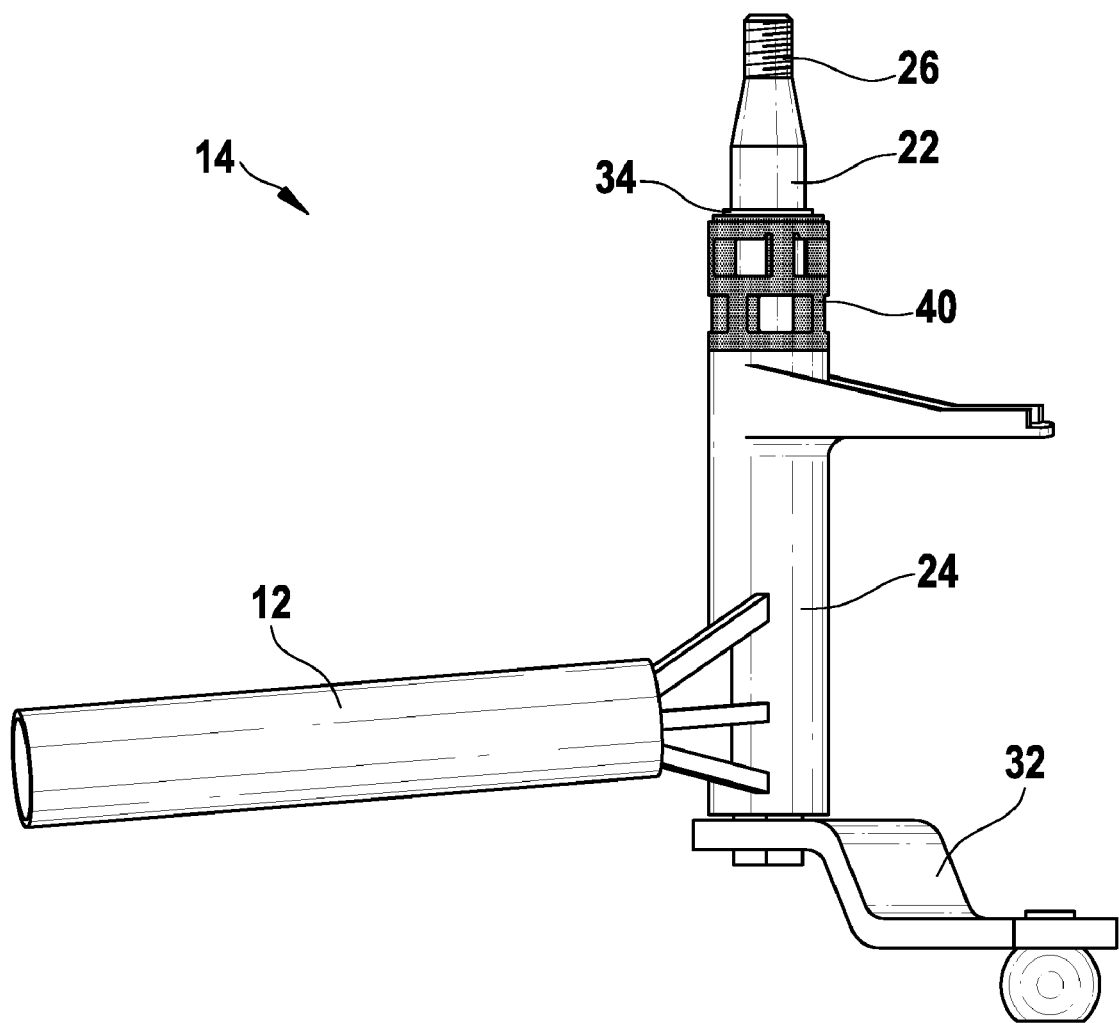

FIG. 2 depicts a detailed perspective side view of a wiper bearing 14 of a windshield wiper device 10 in accordance with the invention. The wiper shaft 22 is mounted in an essentially tubular bearing housing 24 of the wiper bearing 14. It has a first end 26 on which it is connected in a rotationally fixed manner to a wiper arm (not shown here for the sake of providing an unimpaired view). This first end 26 is comprised of a tapered section, which terminates in a thread that concludes the wiper shaft 22. The drive crank 32 is arranged in a rotationally fixed manner with the wiper shaft 22 in the area of the wiper shaft 22 along the longitudinal extension facing away from the first end 26 of the wiper shaft 22. This drive crank 32 in turn is connected in an articulated manner to the thrust rod 20 (FIG. 1). Furthermore, the wiper shaft features a shoulder 34, which is embodied as a disk and is fixed axially to the wiper shaft 22. In one variation, the shoulder 34 can also be embodied as a single piece with the wiper shaft 22 or be formed by the drive crank 32 itself, if it is arranged in the area of the first end 26 of the wiper shaft 22, as FIG. 1 shows. In another variation, it is possible for the shoulder 34 to be embodied as a radially and axially moveable disk, whose axial movement is delimited by the drive crank 32. In principle, however the shoulder 34 can be comprised of an at least partially annular recess or an opening into which a snap ring, or a pin or bolt, or any other holding element is inserted.

The wiper shaft 22 projects from a front side of the bearing housing 24, which faces the first end 26. A bridging element is attached as an element 40 between the shoulder 34 and the front side of the bearing housing 24. A metal or plastic disk can also be attached as a stop disk to the front side of the bearing housing to support the element 40.

The drive crank 32 is connected in a rotationally fixed manner to the wiper shaft 22 on the front side of the bearing housing 24, which faces away from the bridging element 40. In this case, the drive crank 32 directly abuts the front side of the bearing housing 24 so that the wiper shaft is fixed axially by the shoulder 34 and the drive crank 32. One or more stop disks can also be provided between the front side of the bearing housing 24 facing away from the bridging element 40 and the drive crank 32.

If, as FIG. 1 shows, the drive crank 32 is arranged in the area of the first end 26 of the wiper shaft 22, a special fixing element can also be provided for axial fixation to the end of the wiper shaft 22 facing away from the first end 26. In particular, the drive crank 32 can then replace the shoulder 34.

Figure 3:
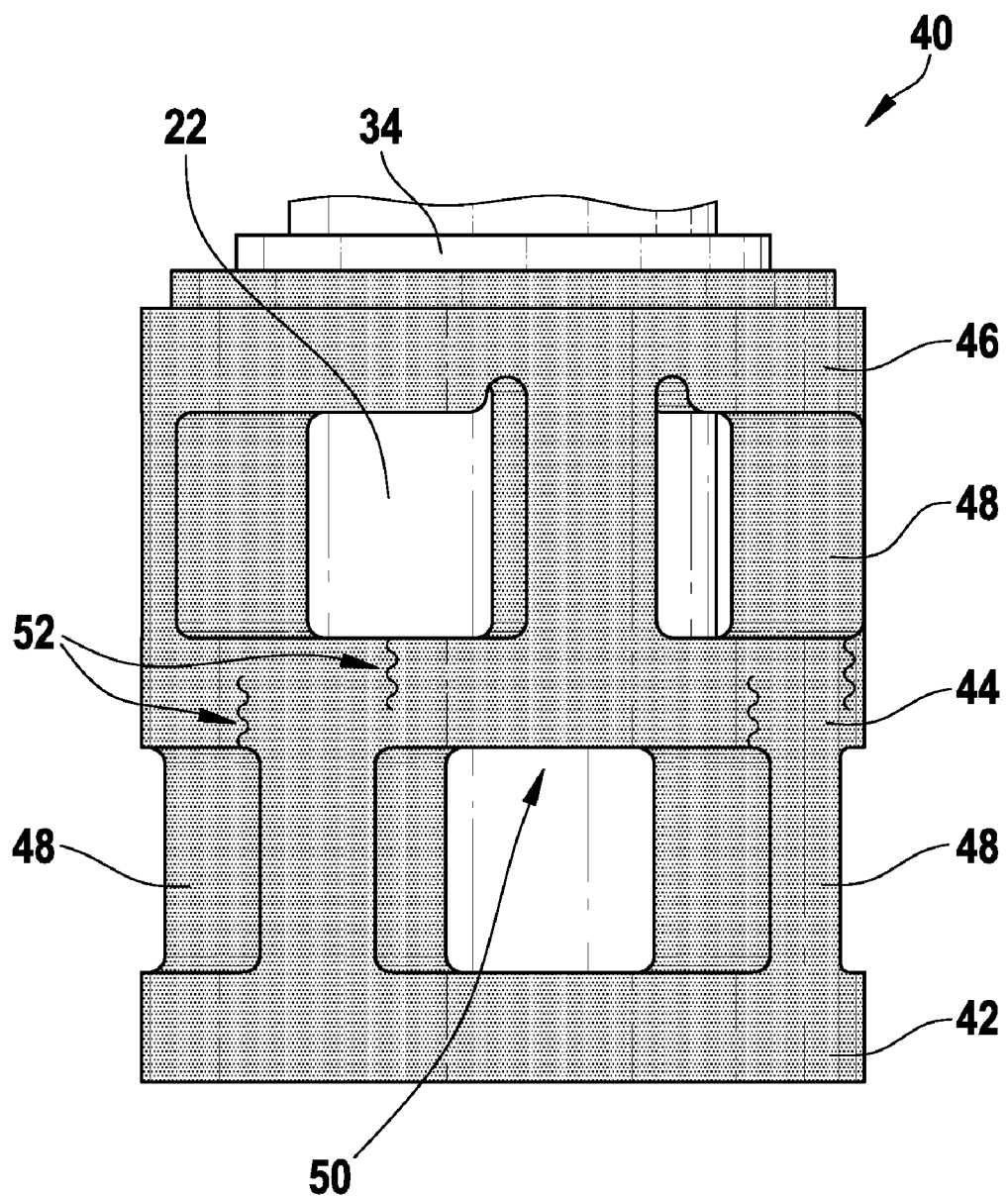

FIG. 3 shows a detailed side view of the bridging element 40 with a section of the wiper shaft 22 and the shoulder 34. The bridging element 40 is essentially comprised of three planar components, herein referred to as planes (42, 44, 46), which are essentially embodied in a circular ring-shaped manner and in a mounted state fit snuggly around the wiper shaft 22. Arranged between the first, base-side plane 42, which in a mounted state is adjacent to the front side of the bearing housing 24 (FIG. 2), and the neighboring, adjacent center plane 44 are connecting pieces 48, which extend vertically from the base-side plane 42 parallel to the wiper shaft 22 and essentially have a rectangular shape. These connecting pieces 48 support the center plane 44. Additional connecting pieces 48 are arranged on the center plane 44 offset from the connecting pieces 48 that extend from the base-side plane 42. These connecting pieces also have an essentially rectangular shape and are arranged so that they are offset from the connecting pieces that extend from the base-side plane 42. The consequence of this is that individual connecting pieces 48 do not overlap with a projection of the connecting pieces 48 in a plane perpendicular to the wiper shaft 22. The additional connecting pieces 48, extending from the center plane 44 in the direction facing away from the base-side plane 42, i.e., in the direction of the free end 26 of the wiper shaft 22, support, on their end facing away from the center plane 44, the top plane 46 that forms the conclusion of the bridging element 40.

Thus, a bridging area 50 is produced in the center plane 44 between two respective connecting pieces 48 emanating from the base-side plane 42. Extending from said bridging area is a connecting piece 48 going from the center plane 44 towards the top plane 46. Arranged in the areas of the center plane 44, which are not supported by the connecting pieces 48 and where no connecting pieces 48 are located to support the top plane 46, are predetermined breaking points 52, which are formed, for example, by a taper or reduction in the resistance cross-section of the center plane 44, for example, by an incision.

Expressed more generally, every plane 42, 44, 46 is thus connected to the respective adjacent plane 42, 44, 46 by connecting pieces 48. At least one predetermined breaking point 52 is provided for each connecting piece 48 in the adjacent plane 44 as long this does not form the base-side plane 42 or the top plane 46, i.e., does not form an outer-edge plane 42, 46. As a result, there are just as many predetermined breaking points 52 arranged on all center planes 44 as connecting pieces 48 emanate therefrom.

The shoulder 34 comes to lie on the top plane 46 so that the wiper shaft 22 is axially supported against downward displacement.

Figure 4:
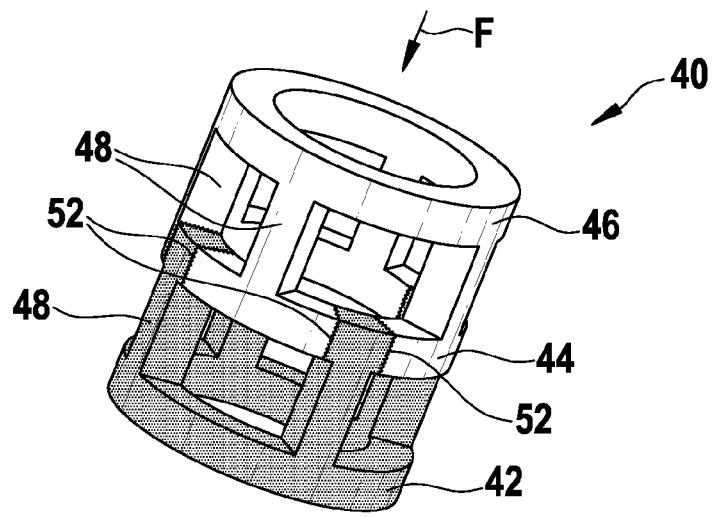
Figure 5:
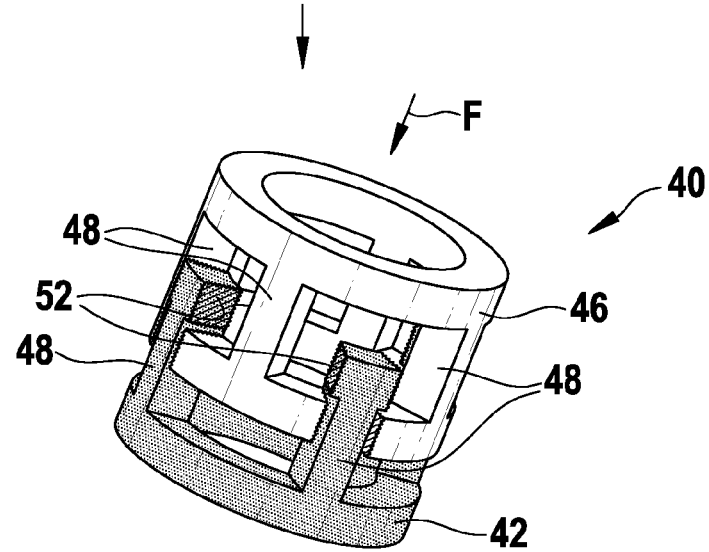
Figure 6:
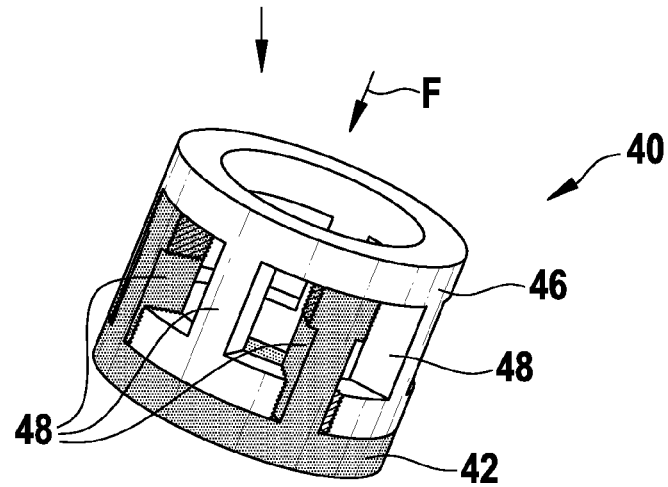

FIGS. 4, 5 and 6 depict the bridging element 40 during an impact of force F such as may occur when a pedestrian impacts the free end 26 of the wiper shaft 22. The reference numbers used here are identical to those in FIG. 3. The bridging element 40 has four connecting pieces 48 between each of the two adjacent planes 42, 44, 46. In addition, eight predetermined breaking points 52 are provided here in the center plane 44, each of which are situated between two of the eight connecting pieces 48. The two outer-edge planes 42, 46 do not have any predetermined breaking points 52. In this way, the upper top plane 46 can move in the direction of the base plane 42 together with the connecting pieces 48 extending from it when the predetermined breaking points 52 break. The connecting pieces 48 that are connected to the top plane 46 then glide downward between the connecting pieces 48 that are connected to the base plane 42, thereby considerably reducing the overall height of the bridge element 40. Since the top plane 46 forms the bearing surface for the shoulder 34, which is connected to the wiper shaft 22 in an axially fixed manner, the first end 26 of the wiper shaft 22 can glide downward in this manner, or expressed in another way, presses the top plane 46 with the connecting pieces 48 on the center plane 44 via an impact of force, thereby breaking the predetermined breaking points 52. The top plane 46 glides downward with the connecting pieces 48 extending from it and, namely, in such a way that the connecting pieces 48 extending from the base-side plane 42 intermesh in a crown-like manner with the connecting pieces 48 extending from the top plane 46. As a result, the first end 26 of the wiper shaft 22 glides downward with the action of a force F, which is greater than a predetermined force, thereby reducing the risk of injury to a pedestrian. The center plane 44 is destroyed in the process.

In this way, after this type of impact, only the bridging element 40 of the windshield wiper device 10 must be replaced.

Figure 7:
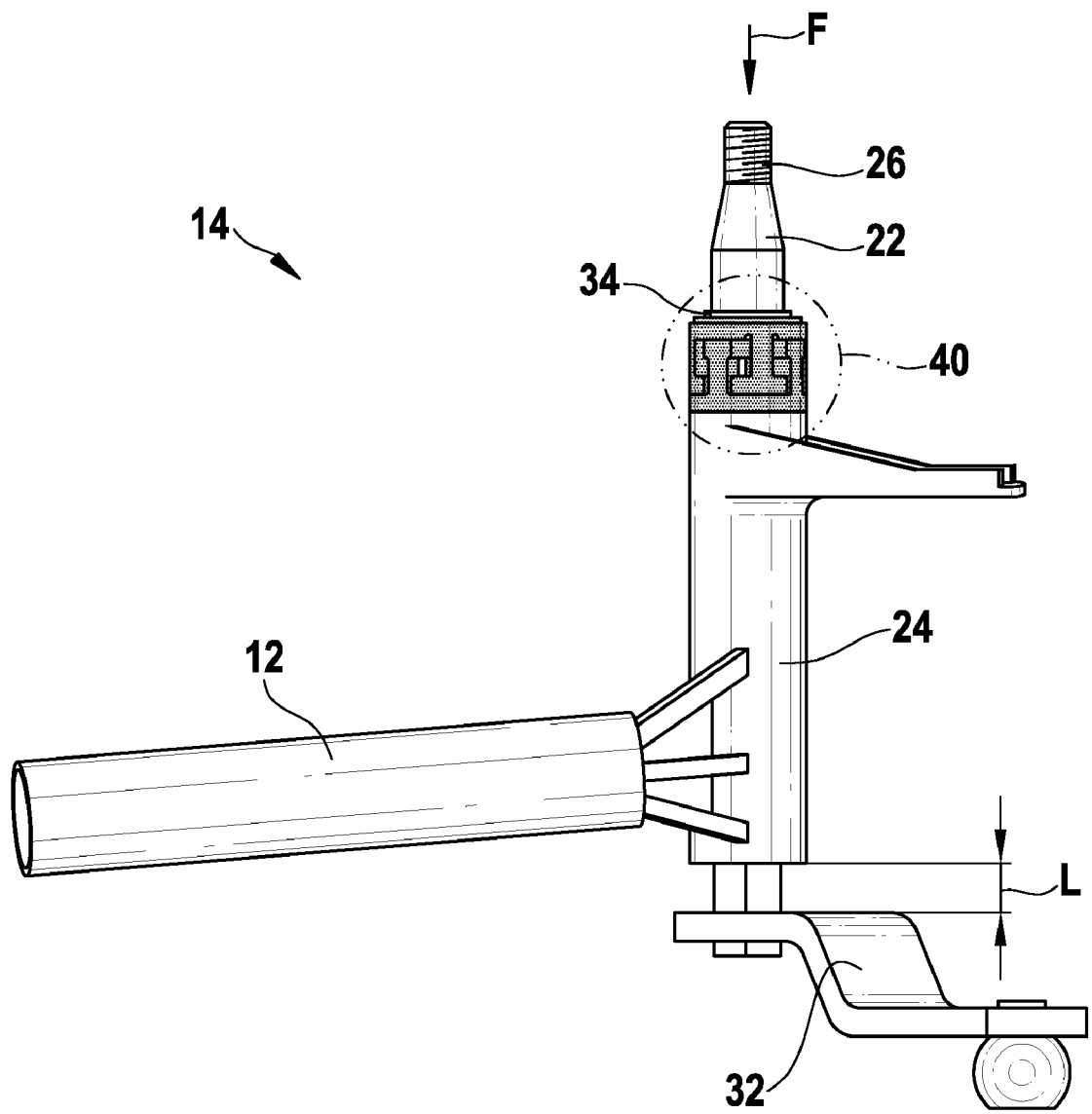

FIG. 7 depicts the wiper bearing 14 from FIG. 2 after the effect of force F. The bridging element 40 is compressed via the yielding of the first end 26 of the wiper shaft 22 with the shoulder 34. The center plane 44 has been destroyed. The wiper shaft 22 has glided downward within the bearing housing 24 so that a gap L is produced between the front side of the bearing housing 24 facing away from the first end 26 of the wiper shaft 22 and the drive crank 32. The wiper shaft 22 has therefore glided downward within the bearing housing 24.

Figure 8:
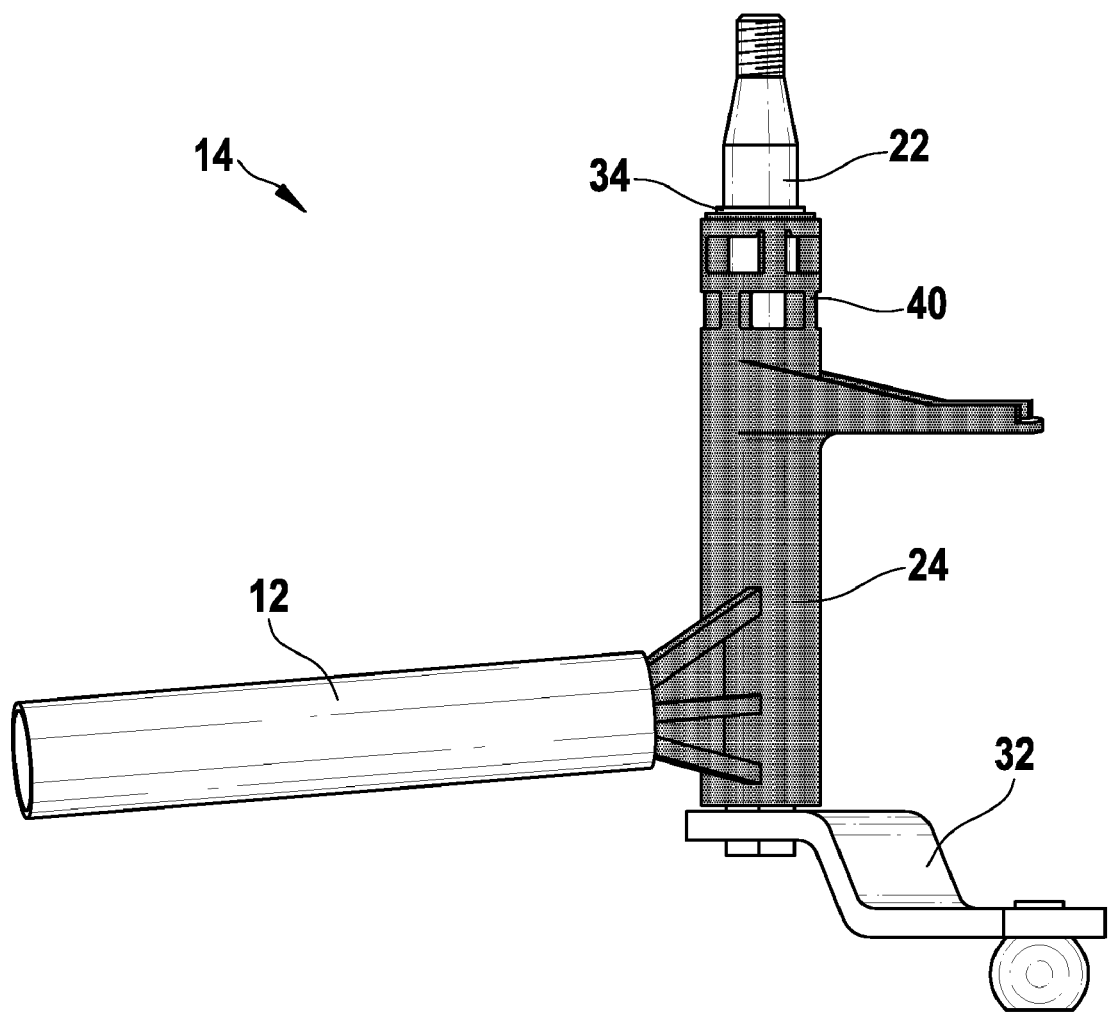

FIG. 8 depicts a variation of the invention. The bridging element 40 is embodied as a single piece with the bearing housing 24. As a result, the front side of the wiper bearing 24 itself forms the base plane 42 of the bridging element 40.

The bridging element 40 is manufactured as a single piece of plastic. Of course, it is also possible to manufacture it of metal or ceramic and in accordance with specifications by a person skilled in the art with regard to the required forces and profiles for the progression of force. The bearing housing 24 can also be embodied of plastic. Just as is the case with the bridging element 40, an embodiment as an injection molded part is also possible in the case of the bearing housing 24, also using a multi-component injection molding process. A corresponding diecasting process can also be considered, particularly with an embodiment of metal.

In order to prevent the bridging element 40 from twisting during operation, securing agents, e.g., a pin or peg pin, having a respective corresponding recess in the bearing housing 24 or in the bridging element 40 can also be provided. They must be arranged in such a way that the crown-like displacement of the top area 46 with the connecting pieces 48 via the effect of force F is not hampered.

The invention claimed is:

1. Windshield wiper device (10), comprising at least one wiper bearing (14) including a bearing housing (24); a wiper shaft (22) that is mounted in the bearing housing (24) and can bear a wiper arm on a first end (26); and an element (40) that axially supports the wiper shaft (22), characterized in that the element (40) is embodied as a bridging element including first, second and third planar components (42, 44, 46) spaced along an axis of the wiper shaft (22), a first plurality of connecting pieces (48) extending between the first planar component (42) and the second planar component (44), and a second plurality of connecting pieces (48) extending between the second planar component (44) and the third planar component (46), wherein the second plurality of connecting pieces (48) are offset from the first plurality of connecting pieces (48), characterized in that the bridging element (40) has at least one predetermined breaking point (52), and characterized in that at least one predetermined breaking point (52) is provided in at least one planar component (42, 44, 46), and wherein the at least one predetermined breaking point (52) comprises a reduction in a resistance cross-section of the at least one planar component (42, 44, 46).

2. Windshield wiper device (10) according to claim 1, characterized in that the wiper shaft (22) has a shoulder (34) and the bridging element (40) is arranged between the bearing housing (24) and the shoulder (34).

3. Windshield wiper device (10) according to claim 2, characterized in that the shoulder (34) is essentially disk-shaped and essentially surrounds the wiper shaft.

4. Windshield wiper device (10) according to claim 2, characterized in that the shoulder (34) is embodied as a single piece with the wiper shaft (22).

5. Windshield wiper device (10) according to claim 2, characterized in that the wiper shaft (22) can be driven by a drive crank (32), which is embodied as a single piece with the shoulder (34) or that serves as a shoulder itself (34).

6. Windshield wiper device (10) according to claim 2, characterized in that the bearing housing (24), the wiper shaft (22) or the shoulder (34) have securing agents (37) to prevent twisting and/or displacement of the bridging element (40).

7. Windshield wiper device (10) according to claim 1, characterized in that the connecting pieces (48) run diagonal to the wiper shaft (22).

8. Windshield wiper device (10) according to claim 1, characterized in that the connecting pieces (48) are arranged parallel to the wiper shaft (22).

9. Windshield wiper device (10) according to claim 1, characterized in that the bridging element (40) is protected from corrosion.

10. Windshield wiper device (10) according to claim 9, wherein the bridging element (40) is made of plastic.

11. Windshield wiper device (10), comprising at least one wiper bearing (14) including a bearing housing (24); a wiper shaft (22) that is mounted in the bearing housing (24) and can bear a wiper arm on a first end (26); and an element (40) that axially supports the wiper shaft (22), characterized in that the element (40) is embodied as a bridging element including first, second and third planar components (42, 44, 46) spaced along an axis of the wiper shaft (22), a first plurality of connecting pieces (48) extending between the first planar component (42) and the second planar component (44), and a second plurality of connecting pieces (48) extending between the second planar component (44) and the third planar component (46), wherein the second plurality of connecting pieces (48) are offset from the first plurality of connecting pieces (48), characterized in that the first, second and third planar components (42, 44, 46) are essentially ring-shaped and are coaxial to the wiper shaft, and characterized in that the first plurality of connecting pieces (48) are circumferentially offset from the second plurality of connecting pieces (48), such that the first plurality of connecting pieces (48) do not overlap with the second plurality of connecting pieces.

12. Windshield wiper device (10) according to claim 11, characterized in that the first plurality of connecting pieces comprises at least three connecting pieces (48), and the second plurality of connecting pieces comprises at least three connecting pieces (48), and at least one predetermined breaking point (52) is provided in the second planar component (44) for each of the first and second pluralities of connecting piece (48).

13. Windshield wiper device (10) according to claim 11, characterized in that the bridging element (40) is embodied as a single piece with the bearing housing (24).

14. Windshield wiper device (10) according to claim 11, wherein the first plurality of connecting pieces (48) includes four connecting pieces (48) and the second plurality of connecting pieces (48) includes four connecting pieces (48), such that each of the plurality of connecting pieces (48) is circumferentially offset from adjacent connecting pieces (48) by about 45 degrees.

15. Windshield wiper device (10) according to claim 14, wherein the first plurality of connecting pieces (48) and the second plurality of connecting pieces (48) alternate circumferentially around the second planar component (44), such that the first plurality of connecting pieces (48) are spaced about 90 degrees apart around the wiper shaft, and the second plurality of pieces (48) are spaced about 90 degrees apart around the wiper shaft.

* * * * *